(12) United States Patent
Kumano

(10) Patent No.: US 7,702,205 B2
(45) Date of Patent: Apr. 20, 2010

(54) OPTICAL FIBER

(75) Inventor: Naomi Kumano, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/426,671

(22) Filed: Apr. 20, 2009

(65) Prior Publication Data

US 2009/0263091 A1    Oct. 22, 2009

Related U.S. Application Data

(63) Continuation of application No. PCT/JP2008/064416, filed on Aug. 11, 2008.

(60) Provisional application No. 61/032,612, filed on Feb. 29, 2008.

(51) Int. Cl.
*G02B 6/02* (2006.01)

(52) U.S. Cl. ..................... 385/127; 385/126; 385/128

(58) Field of Classification Search .................. None
See application file for complete search history.

(56) References Cited

U.S. PATENT DOCUMENTS

| 6,337,942 B1 | 1/2002 | Kato et al. |
| 6,731,847 B1 * | 5/2004 | Kato et al. .................. 385/127 |
| 7,519,255 B2 | 4/2009 | Kumano et al. |

FOREIGN PATENT DOCUMENTS

| JP | 62-297808 | 12/1987 |
| JP | 2002-532745 | 10/2002 |
| WO | WO00/42458 | 7/2000 |

* cited by examiner

*Primary Examiner*—Uyen-Chau N Le
*Assistant Examiner*—Chad H Smith
(74) *Attorney, Agent, or Firm*—Oblon, Spivak, McClelland, Maier & Neustadt, L.L.P.

(57) ABSTRACT

A relative refractive index difference $\Delta 1$ between a center core region and a cladding layer is 0.30% to 0.35%, a relative refractive index difference $\Delta 2$ between an outer core layer and the cladding layer is −0.10% to −0.04%, and $\Delta 1:\Delta 2$ is 2.5:1 to 7.5:1. A diameter of the center core region is 9.0 μm to 10.5 μm, and a ratio of diameters of the center core region and the outer core layer is 0.20 to 0.35. A cutoff wavelength is 1310 nm or shorter, a zero dispersion wavelength is 1285 nm to 1345 nm, and at a wavelength of 1550 nm, an MFD is 10.5 μm or larger, a transmission loss is 0.185 dB/km or lower, and a bending loss is 15 dB/m or lower.

2 Claims, 5 Drawing Sheets

FIG.4

| PARAM-ETER | | Δ1' | Δ1 | Δ2 | Δ1:Δ2 | a/b | a | CUTOFF WAVE-LENGTH | ZERO DISPERSION WAVELENGTH | MFD | Aeff | BENDING LOSS | TRANS-MISSION LOSS | n2/Aeff | RAMAN GAIN |
|---|---|---|---|---|---|---|---|---|---|---|---|---|---|---|---|
| UNIT | | % | % | % | | | μm | nm | nm | μm | μm² | dB/m | dB/km | 10⁻¹⁰/W | 1/W/km |
| EMBODIMENT EXAMPLE | 1 | - | 0.30 | -1.0 | 3:1 | 0.30 | 10.4 | 1302 | 1285 | 10.5 | 88.7 | 5 | 0.181 | 2.31 | 0.139 |
| | 2 | - | 0.30 | -0.05 | 3:1 | 0.20 | 9.2 | 1209 | 1300 | 10.5 | 85.4 | 10 | 0.181 | 2.34 | 0.144 |
| | 3 | 0.30 | 0.32 | -0.10 | 3:1 | 0.25 | 10.2 | 1281 | 1286 | 10.5 | 87.9 | 8 | 0.169 | 2.33 | 0.141 |
| | 4 | 0.30 | 0.32 | -0.05 | 6:1 | 0.25 | 9.7 | 1279 | 1295 | 10.9 | 90.8 | 10 | 0.181 | 2.26 | 0.136 |
| | 5 | 0.26 | 0.30 | -0.04 | 6.5:1 | 0.28 | 9.8 | 1305 | 1290 | 11.4 | 106.6 | 3 | 0.180 | 1.94 | 0.117 |
| | 6 | 0.28 | 0.32 | -0.04 | 7:1 | 0.22 | 10.0 | 1308 | 1291 | 11.4 | 107.5 | 3 | 0.185 | 1.90 | 0.114 |
| COMPARISON EXAMPLE | 1 | 0.25 | 0.29 | -0.10 | 2.5:1 | 0.33 | 10.8 | 1293 | 1283 | 10.9 | 97.3 | 15 | 0.190 | 2.10 | 0.126 |
| | 2 | 0.21 | 0.25 | -0.05 | 4.2:1 | 0.33 | 11.1 | 1278 | 1288 | 12.0 | 115.1 | 25 | 0.188 | 1.75 | 0.105 |
| | 3 | 0.30 | 0.32 | -0.15 | 2:1 | 0.33 | 10.3 | 1278 | 1281 | 10.0 | 82.8 | 5 | 0.195 | 2.48 | 0.150 |
| | 4 | 0.30 | 0.32 | -0.10 | 3:1 | 0.50 | 9.9 | 1288 | 1289 | 10.2 | 85.0 | 3 | 0.185 | 2.41 | 0.146 |
| | 5 | 0.30 | 0.32 | -0.10 | 3:1 | 0.15 | 10.2 | 1285 | 1287 | 10.1 | 84.9 | 5 | 0.185 | 2.41 | 0.146 |
| | 6 | - | 0.35 | - | - | - | 9.2 | 1260 | 1310 | 10.4 | 82.0 | 11.2 | 0.190 | 2.53 | 0.151 |

OPTICAL FIBER

CROSS-REFERENCE TO RELATED APPLICATIONS

This application is a continuation of PCT/JP2008/064416 filed on Aug. 11, 2008, the entire content of which are incorporated herein by reference.

BACKGROUND OF THE INVENTION

1. Field of the Invention

The present invention relates to an optical fiber used as an optical transmission line for an optical communication.

2. Description of the Related Art

As a conventional optical transmission line for an optical communication, a standard single-mode optical fiber (SMF) defined in the ITU-T (International Telecommunication Union Telecommunication Standardization Sector) G. 652 is most commonly used.

For an optical fiber used as an optical transmission line for a long-haul optical communication, a transmission loss far lower than that of the standard SMF is required to extend a transmission distance and to reduce a load to an optical amplifier as an optical repeater. In addition, a nonlinearity even lower than that of the standard SMF is required to suppress a quality degradation of an optical signal due to a nonlinear optical phenomenon and to make a transmission distance even longer. Furthermore, particularly for an optical fiber used in an optical fiber cable installed as a land transmission line, a low bending loss is required because a bending and a lateral pressure are applied on the optical fiber at the time of setting it in a slot of a cable.

As an optical fiber that realizes a low transmission loss, an optical fiber in which the core region is made of pure silica glass that does not contain germanium and the cladding layer is doped with fluorine and an optical fiber in which the core region is doped with chlorine and the cladding layer is doped with fluorine have been disclosed (see, for example, International Publication No. 00/42458 pamphlet). The pure silica glass mentioned above means a silica glass in which no dopant for controlling the refractive index is doped.

However, the convention optical fiber that realizes a low transmission loss requires a massive amount of fluorine at the time of manufacturing the fiber because the whole cladding layer is doped with fluorine. As a result, there has been a problem that the cost of the optical fiber is increased.

In addition, because a variety of technologies for using the standard SMF as an optical transmission line have been accumulated, an optical fiber that realizes low transmission loss and low nonlinearity while maintaining equivalent characteristics to those of the standard SMF is being required.

SUMMARY OF THE INVENTION

It is an object of the present invention to at least partially solve the problems in the conventional technology.

According to one aspect of the present invention, there is provided an optical fiber made of silica-based glass. The optical fiber includes a center core region containing germanium having a first refractive index; an outer core layer containing fluorine having a second refractive index formed on an outer circumference of the center core region; and a cladding layer made of pure silica glass having a third refractive index formed on an outer circumference of the outer core layer. The second refractive index is lower than the first refractive index, and the third refractive index is higher than the second refractive index and lower than the first refractive index. A maximum relative refractive index difference $\Delta 1$ of the center core region with respect to the cladding layer is 0.30% to 0.35%, and a relative refractive index difference $\Delta 2$ of the outer core layer with respect to the cladding layer is $-0.10\%$ to $-0.04\%$. A ratio of the relative refractive index difference $\Delta 1$ to the relative refractive index difference $\Delta 2$ is 2.5:1 to 7.5:1. A diameter a of the center core region is 9.0 micrometers to 10.5 micrometers, and a ratio a/b of the diameter a of the center core region to a diameter b of the outer core layer is 0.20 to 0.35. The optical characteristics of the optical fiber show that a cutoff wavelength is equal to or shorter than 1310 nanometers, a zero dispersion wavelength is 1285 nanometers to 1345 nanometers, a mode field diameter at a wavelength of 1550 nanometers is equal to or larger than 10.5 micrometers, a transmission loss at the wavelength of 1550 nanometers is equal to or lower than 0.185 dB/km, and a bending loss at the wavelength of 1550 nanometers is equal to or lower than 15 dB/m.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a table showing design parameters and optical characteristics of optical fibers according to embodiment examples 1 to 6 of the present invention and comparison examples 1 to 6;

DETAILED DESCRIPTION OF THE PREFERRED EMBODIMENTS

Exemplary embodiments of an optical fiber according to the present invention will be explained in detail below with reference to the accompanying drawings. However, the present invention is not to be considered limited to the embodiments. A bending loss mentioned in the specification means a bending loss under a condition that the optical fiber is wound with a diameter of 20 millimeters. Other terminologies not specifically defined in this specification comply with the definitions and the measurement methods in the ITU-T G. 650.1.

Figure 1:
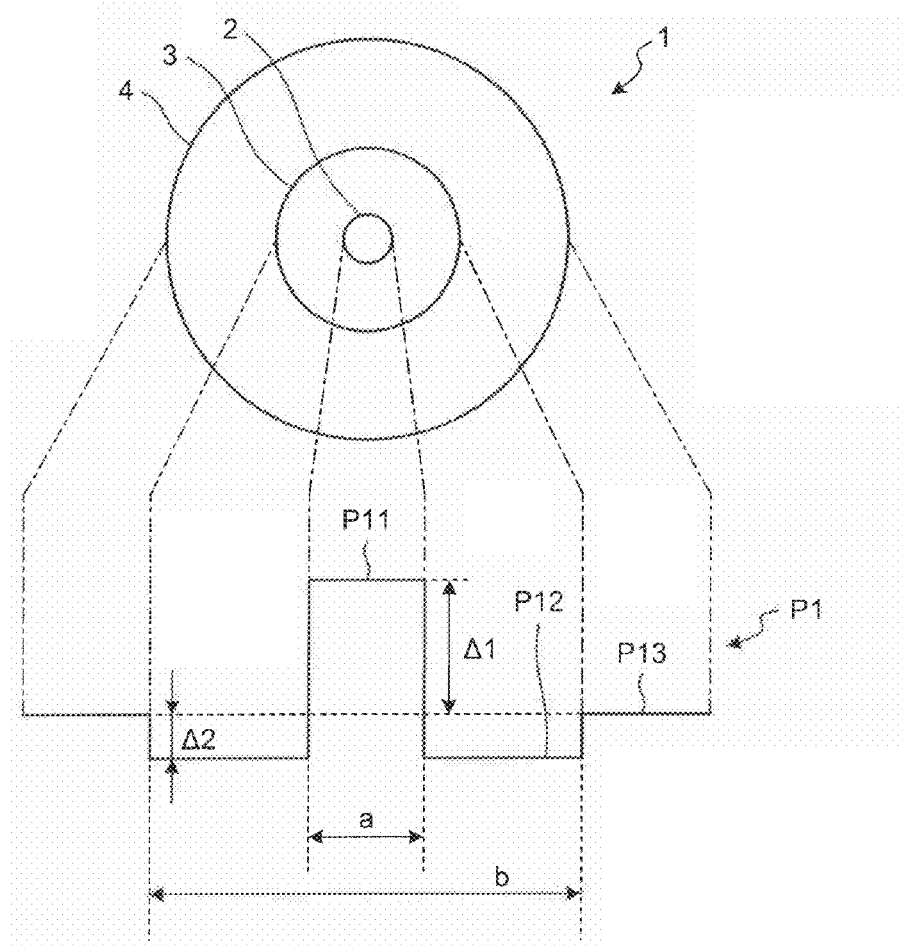
FIG. 1 is a schematic diagram for illustrating a cross section of an optical fiber according to an embodiment of the present invention and its corresponding refractive index profile.

FIG. 1 is a schematic diagram for illustrating a cross section of an optical fiber 1 according to an embodiment of the present invention and its corresponding refractive index profile. As shown in FIG. 1, the optical fiber 1, which is made of silica-based glass, includes a center core region 2 that contains germanium, an outer core layer 3 that contains fluorine, and a cladding layer 4 made of pure silica glass. The outer core layer 3 is formed on the outer circumference of the center core region 2. The cladding layer 4 is formed on the outer circumference of the outer core layer 3.

As indicated by a refractive index profile P1, the center core region 2 has a step-like refractive index profile P11, the outer core layer 3 has a virtually uniform refractive index profile P12 with a refractive index lower than that of the center core region 2, and the cladding layer 4 has a refractive index profile P13 with a refractive index higher than that of the outer core layer 3 and lower than that of the center core region 2.

As design parameters of the optical fiber 1, the maximum relative refractive index difference Δ1 of the center core region 2 with respect to the cladding layer 4, i.e., the pure silica glass, is set to 0.30% to 0.35%, a relative refractive index difference Δ2 of the outer core layer 3 with respect to the cladding layer 4 is set to −0.10% to −0.04%, a ratio of the relative refractive index difference Δ1 to the relative refractive index difference Δ2 is set to 2.5:1 to 7.5:1, a diameter a of the center core region 2 is set to 9.0 micrometers to 10.5 micrometers, and a ratio a/b of the diameter a of the center core region 2 to a diameter b of the outer core layer 3 is set to 0.20 to 0.35.

The relative refractive index differences Δ1 and Δ2 are defined by the following Equations (1) and (2).

$$\Delta 1 (\%) = \{(n_1^2 - n_c^2)/2n_c^2\} \times 100 \quad (1)$$

$$\Delta 2 (\%) = \{(n_2^2 - n_c^2)/2n_c^2\} \times 100 \quad (2)$$

where $n_1$ is the maximum refractive index of the center core region 2, $n_2$ is the refractive index of the outer core layer 3, and $n_c$ is the refractive index of the cladding layer 4.

The diameter a of the center core region 2 is defined as a diameter at a position in a boundary area between the center core region 2 and the outer core layer 3 where the value of the relative refractive index difference is a half of Δ1. The diameter b of the outer core layer 3 is defined as a diameter at a position in a boundary area between the outer core layer 3 and the cladding layer 4 where the value of the relative refractive index difference is a half of Δ2.

With the help of the above structure and refractive index profile, the optical fiber 1 has optical characteristics: the cutoff wavelength is equal to or shorter than 1310 nanometers; and the zero dispersion wavelength is 1285 nanometers to 1345 nanometers. In addition, as the optical characteristics at a wavelength of 1550 nanometers, the mode field diameter (MFD) is equal to or larger than 10.5 micrometers, the transmission loss is equal to or lower than 0.185 dB/km, and the bending loss is equal to or lower than 15 dB/m. In other words, the optical fiber 1 realizes low transmission loss and low nonlinearity while maintaining the optical characteristics equivalent to those of the standard SMF.

The standard SMF has a step index profile, including a core region doped with germanium and a cladding layer made of pure silica glass formed on the outer circumference of the core region. The standard SMF realizes the optical characteristics such that the cutoff wavelength is equal to or shorter than 1310 nanometers, with a typical value of 1260 nanometer, and the zero dispersion wavelength is 1285 nanometers to 1345 nanometers, with a typical value of 1310 nanometers by setting the diameter of the core region to about 8.5 micrometers and the relative refractive index difference of the core region with respect to the cladding layer to about 0.35%. In addition, as the typical optical characteristics of the standard SMF at the wavelength of 1550 nanometers, the MFD is about 10.4 micrometers, the transmission loss is about 0.19 dB/km, and the bending loss is equal to or lower than 15 dB/m. The cutoff wavelength mentioned in the specification means the fiber cutoff wavelength $\lambda_c$ defined in the ITU-T G. 650.1.

On the other hand, the optical fiber 1 according to the embodiment decreases the germanium content in the center core region 2 by setting the relative refractive index difference Δ1 to 0.30% to 0.35%, which is equal to or lower than that of the standard SMF, so that the transmission loss is decreased by reducing the Rayleigh scattering caused by the germanium in the center core region 2. At the same time, the relative refractive index difference is kept within a range not to increase the bending loss. Furthermore, the outer core layer 3 is additionally provided with the relative refractive index difference Δ2 set to −0.10% to −0.04%, so that an increase of the transmission loss and a shrinkage of the MFD are suppressed while decreasing the bending loss. Furthermore, by setting the ratio of Δ1 to Δ2 to 2.5:1 to 7.5:1, a viscosity matching is obtained between glasses of the center core region 2 and the outer core layer 3, so that an occurrence of a distortion at the boundary between the center core region 2 and the outer core layer 3 is suppressed, and the transmission loss is further decreased. In addition, by setting the ratio a/b to 0.20 to 0.35, a balance between the cutoff wavelength and the bending loss is maintained within a proper range while increasing the MFD. As a result, the nonlinearity and the transmission loss are decreased because the effective core area is increased with the increase of the MFD while maintaining the characteristics equivalent to those of the standard SMF in terms of the cutoff wavelength, the zero dispersion wavelength, and the bending loss. Moreover, compared to an optical fiber in which the whole cladding layer is doped with fluoride, the fluoride used in the fiber is decreased by a considerable amount, which leads to a low cost. If Δ1:Δ2 is set to 3:1, the best viscosity matching is obtained between the glasses of the center core region 2 and the outer core layer 3, and the transmission loss is most decreased because the occurrence of the distortion at the boundary is suppressed most.

As described above, the optical fiber 1 according to the embodiment makes an optical fiber that can realize low transmission loss and low nonlinearity while maintaining equivalent characteristics to those of the standard SMF at low cost.

A modification example of the embodiment is explained below. While the refractive index profile P11 of the center core region 2 is a step index profile in the optical fiber 1 according to the embodiment, an optical fiber according to the modification example has a refractive index profile of the center core region with a dimpled shape in its center.

As in the case of the optical fiber 1 shown in FIG. 1, the optical fiber according to the modification example is made of silica-based glass, including a center core region that contains germanium, an outer core layer that contains fluorine, and a cladding layer made of pure silica glass. The outer core layer is formed on the outer circumference of the center core region. The cladding layer is formed on the outer circumference of the outer core layer. The diameters of the center core region and the outer core layer of the optical fiber according to the modification example are a and b, respectively, which are the same as those of the optical fiber 1.

Figure 2:
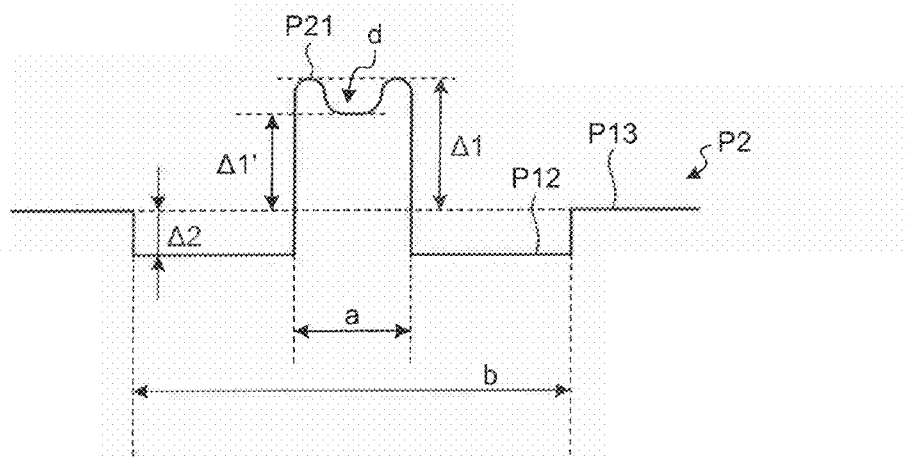
FIG. 2 is a schematic diagram for illustrating a refractive index profile of an optical fiber according to a modification example of the embodiment.

FIG. 2 is a schematic diagram for illustrating a refractive index profile of the optical fiber according to the modification example. As shown in FIG. 2, the optical fiber according to the modification example has a refractive index profile P2 in which the refractive index profiles of the outer core layer and the cladding layer are the same as those of the optical fiber 1, the refractive index profile P12 and the refractive index profile P13, respectively. On the other hand, a refractive index profile P21 of the center core region is different from the refractive index profile P12 of the optical fiber 1, having the maximum relative refractive index difference $\Delta 1$ near the outer circumference of the center core region and a dimpled portion d at the center such that the refractive index is gradually decreased from the outer circumference toward the center. The relative refractive index difference $\Delta 1$ is 0.30% to 0.35% as in the case of the embodiment. On the other hand, the minimum relative refractive index difference $\Delta 1'$ of the dimpled portion d with respect to the cladding layer is 0.26% to 0.32%.

The relative refractive index difference $\Delta 1'$ is defined by the following Equation (3).

$$\Delta 1'(\%) = \{(n_1'^2 - n_c^2)/2n_c^2\} \times 100 \quad (3)$$

where $n_1'$ is the minimum refractive index of the dimpled portion d and $n_c$ is the refractive index of the cladding layer.

With the help of the dimpled portion at the center of the refractive index profile of the center core region with its relative refractive index difference $\Delta 1'$ set to 0.26% to 0.32%, the optical fiber according to the modification example has optical characteristics, similar to those of the embodiment; i.e., the cutoff wavelength is equal to or shorter than 1310 nanometers; and the zero dispersion wavelength is 1285 nanometers to 1345 nanometers. Furthermore, as the optical characteristics at the wavelength of 1550 nanometers, the MFD is equal to or larger than 10.5 micrometers, the transmission loss is equal to or lower than 0.185 dB/km, and the bending loss is equal to or lower than 15 dB/m. In addition, the optical fiber according to the modification example can realize an optical fiber having a large MFD while maintaining the cutoff wavelength at a constant value.

Figure 3:
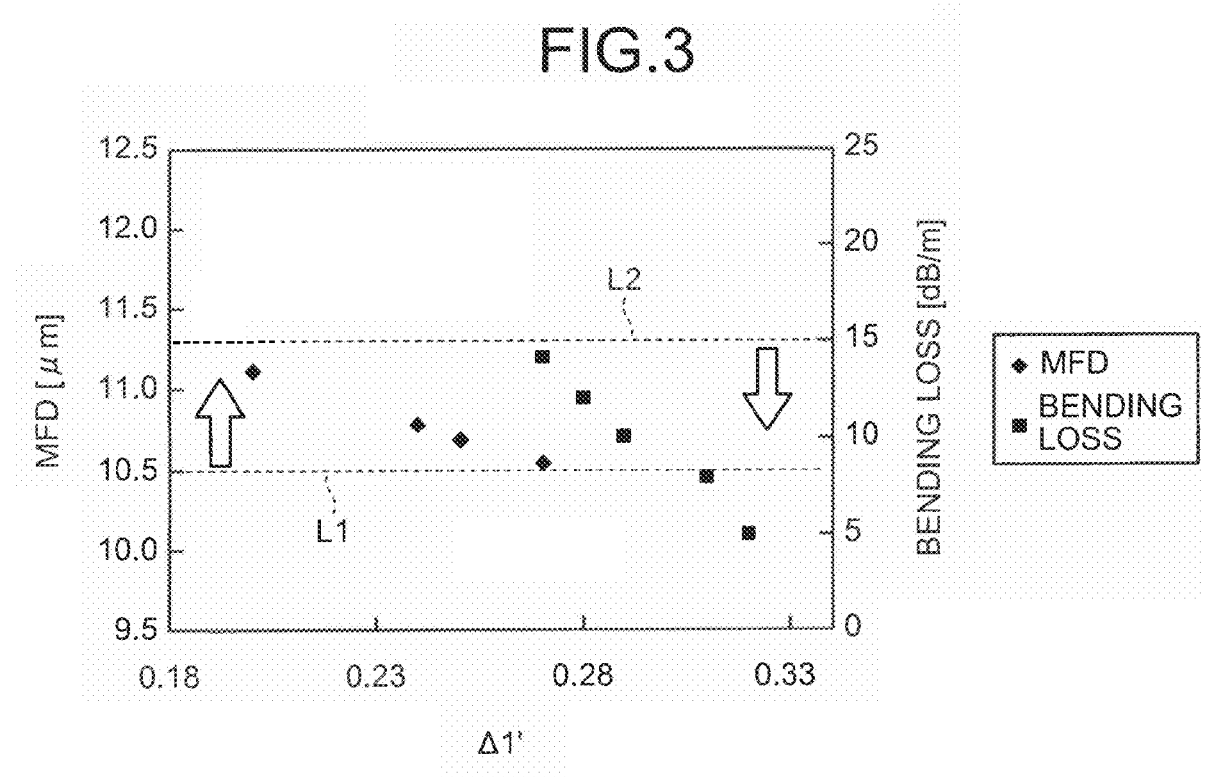
FIG. 3 is a graph showing an example of a relation between relative refractive index difference $\Delta 1'$, mode field diameter, and bending loss in the optical fiber having the refractive index profile shown in FIG. 2.

FIG. 3 is a graph showing an example of a relation between the relative refractive index difference $\Delta 1'$, the MFD, and the bending loss in the optical fiber having the refractive index profile shown in FIG. 2. The graph shown in FIG. 3 is a result of a calculation, with $\Delta 1$ set to 0.32%, $\Delta 2$ set to −0.08%, a/b set to 0.34, and $\Delta 1'$ changed while maintaining the cutoff wavelength at about 1280 nanometers. Both the MFD and the bending loss are values at the wavelength of 1550 nanometers, where a line L1 indicates a position at which the MFD is 10.5 micrometers and a line L2 indicates a position at which the bending loss is 15 dB/m.

As shown in FIG. 3, as the depth of the dimpled portion is increased, i.e., as $\Delta 1'$ is decreased, the MFD is increased, which is preferable. However, the bending loss is also increased with the increase of the MFD. Under the condition shown in FIG. 3, if $\Delta 1'$ is set to 0.26% to 0.28%, the MFD of equal to or larger than 10.5 micrometers and the bending loss of equal to or lower than 15 dB/m can be obtained as in the case of the embodiment. A result of a further calculation performed by changing $\Delta 1$ from 0.30% to 0.35% shows that, if $\Delta 1'$ is set to 0.26% to 0.32%, the MFD of equal to or larger than 10.5 micrometers and the bending loss of equal to or lower than 15 dB/m can be obtained.

The optical fibers according to the embodiment and the modification example can be manufactured, for example, as follows. First, a core soot for forming the center core region and the outer core layer is fabricated by the vapor-phase axial deposition (VAD) method. At this moment, a gas containing germanium as the dopant is supplied to a burner for forming the center core region, and a gas containing fluorine as the dopant is supplied to a burner for forming the outer core layer. Then dehydration and vitrification are performed on the fabricated core soot through a thermal treatment, to form a core rod.

Subsequently, the core rod is heated and elongated with a predetermined outer diameter, a soot that will make the cladding layer is formed on the outer circumference of the elongated core rod by the outside vapor deposition (OVD) method, and then, the dehydration and the vitrification are performed to fabricate an optical fiber preform. Finally, the optical fibers according to the embodiment and the modification example are manufactured by drawing the optical fiber preform. The dimpled portion in the refractive index profile of the optical fiber according to the modification example can be formed by adjusting a position of a burner for forming the center core region and a gas condition to be supplied to the burner.

As embodiment examples 1 to 6 of the present invention, optical fibers according to the embodiment (embodiment examples 1 and 2) and the modification example (embodiment examples 3 to 6) are manufactured, and as comparison examples 1 to 6, optical fibers having any one of the design parameters out of the range of the embodiment and the modification example. FIG. 4 is a table showing the design parameters and the optical characteristics of the optical fibers according to the embodiment examples 1 to 6 and the comparison examples 1 to 6. In FIG. 4, "Aeff" means the effective core area, and "n2" means second-order nonlinear refractive index. Furthermore, "n2/Aeff" is a parameter indicating the nonlinearity of the optical fiber. The nonlinear coefficient γ of the optical fiber is represented by $\gamma = (2\pi/\lambda) \cdot (n2/Aeff)$, where $\lambda$ is the wavelength, which is proportional to "n2/Aeff". All the values of "MFD", "Aeff", "bending loss", "transmission loss" and "n2/Aeff" are values at the wavelength of 1550 nanometers. Moreover, "Raman gain" indicates a Raman gain coefficient at the wavelength of 1550 nanometers when excited with a pump light having a wavelength of 1420 nanometers. The comparison example 6 is an example of the standard SMF.

As shown in FIG. 4, as design parameters of the embodiment examples 1 to 6, $\Delta 1$ is set to 0.30% to 0.35%, $\Delta 1'$ is set to 0.26% to 0.32% in the case of having the dimpled portion, $\Delta 2$ is set to −0.10% to −0.04%, the ratio of $\Delta 1$ to $\Delta 2$ is set to 2.5:1 to 7.5:1, a is 9.0 micrometers to 10.5 micrometers, and a/b is set to 0.20 to 0.35. The result shows that the optical fibers according to the embodiment examples 1 to 6 have optical characteristics: the cutoff wavelength is equal to or shorter than 1310 nanometers; the zero dispersion wavelength is 1285 nanometers to 1345 nanometers; the MFD is equal to or larger than 10.5 micrometers; the transmission loss is equal to or lower than 0.185 dB/km; and the bending loss is equal to or lower than 15 dB/m. In particular, the optical fiber according to the embodiment example 3, in which $\Delta 1:\Delta 2$ is 3:1, has the lowest transmission loss of 0.169 dB/km.

On the other hand, in the optical fibers according to the comparison examples 1 to 5, any one of $\Delta 1'$, $\Delta 2$, and a/b is out of the above range. Furthermore, the optical fiber according to the comparison example 6 is a standard SMF, so that at least one of the MFD and the transmission loss does not meet a desired value. In particular, the optical fiber according to the comparison example 2 has a high bending loss, too.

Furthermore, an optical fiber having the MFD smaller than 10.5 micrometers also has a small effective core area, a high n2/Aeff indicating the nonlinearity, and a high Raman gain coefficient. For example, comparing the optical fiber according to the embodiment example 5 with the optical fiber according to the comparison example 6, the optical fiber according to the embodiment example 5 has the effective core area that is 20% larger, and the n2/Aeff and the Raman gain coefficient that are 20% smaller.

Figure 5:
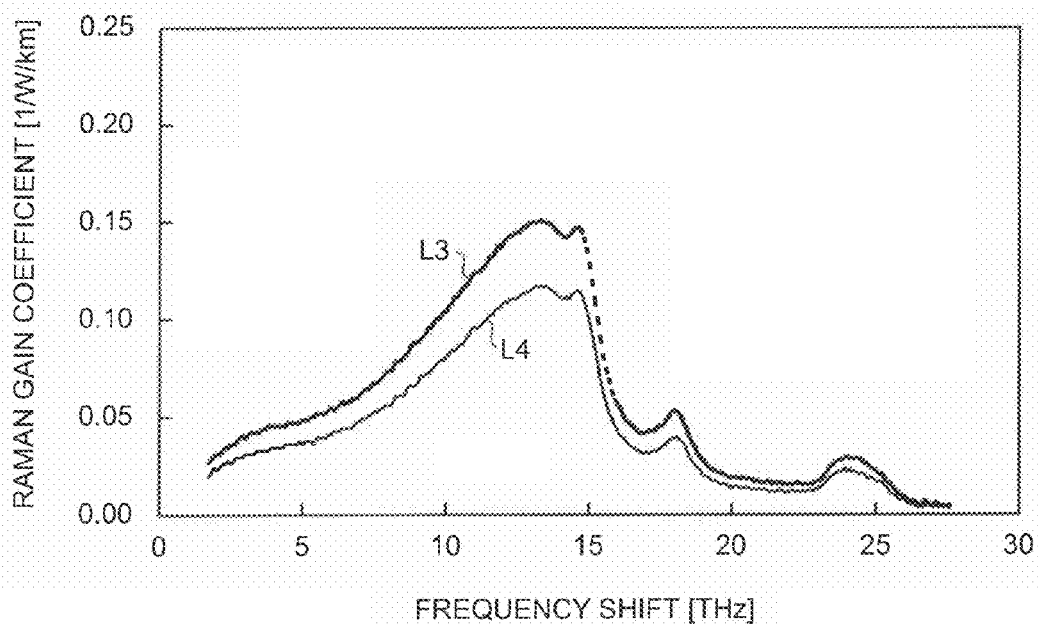
FIG. 5 is a graph showing Raman gain coefficient spectra of the optical fibers according to the embodiment example 5 and the comparison example 6 shown in FIG. 4.

FIG. 5 is a graph showing the Raman gain coefficient spectra of the optical fibers according to the embodiment example 5 and the comparison example 6 shown in FIG. 4. In FIG. 5, the horizontal axis represents the frequency shift, which indicates a shift from the pump wavelength of 1420 nanometers with the optical frequency. In the graph, the Raman gain is maximized near a point where the frequency shift is 13.1 THz. The wavelength at this point is 1530 nanometers. In the graph shown in FIG. 5, a line L3 indicates the spectra of the optical fiber according to the comparison example 6, and a line L4 indicates the spectra of the optical fiber according to the embodiment example 5. As shown in FIG. 5, the Raman gain coefficient of the embodiment example 5 shows, compared with the Raman gain coefficient of the comparison example 6, not only that the maximum value of the Raman gain is low but also that the Raman gain is low across the whole spectra including near the wavelength of 1550 nanometers.

If the n2/Aeff, i.e., the nonlinearity, of the optical fiber is small, for example, an occurrence of a nonlinear optical phenomenon, such as the self phase modulation (SPM) and a cross phase modulation (XPM), can be avoided, which can possibly occur when a high-power optical signal is input or when performing a high-speed optical transmission and a high-density optical transmission, and thus preventing a degradation of a quality of the optical signal due to the nonlinear optical phenomenon.

Furthermore, if the Raman gain coefficient of the optical fiber is small, a problem of the Raman tilt can be avoided, which can possibly occur when performing a broadband optical transmission using the wavelength-division-multiplexing (WDM) technology, and thus preventing a degradation of a WDM optical signal due to the Raman tilt. The problem of the Raman tilt is as follows. When performing a broadband optical transmission using a WDM optical signal, a Raman gain is generated by an optical signal located at a short wavelength side, and a WDM optical signal at a wavelength side longer than the optical signal that generates the Raman gain. However, because the spectra of the Raman gain has a tilt as shown in FIG. 5, the optical intensities of amplified optical signals at the long wavelength side become uneven, having a tilt on the spectra. As a result an undesirable difference is generated in the WDM optical signals.

When fusion splicing the same type of optical fibers, the optical fibers according to the embodiment and the modification example can reduce the splice loss, compared with the case of the standard SMFs. As an example, a result of an experiment is explained below, in which the optical fibers according to the embodiment example 5 are fusion spliced with each other and the optical fibers according to the comparison example 6 are fusion spliced with each other. In the experiment, a product of Furukawa Electric Co. Ltd. S122M4 is used as a fusion splicer for fusion splicing the optical fibers, and as a setting for its splicing condition, a setting for fusion splicing single-core standard SMFs is used. Then, the splice loss at a splice point of the fusion-spliced optical fiber is measured using a light having the wavelength of 1310 nanometers.

Figure 6:
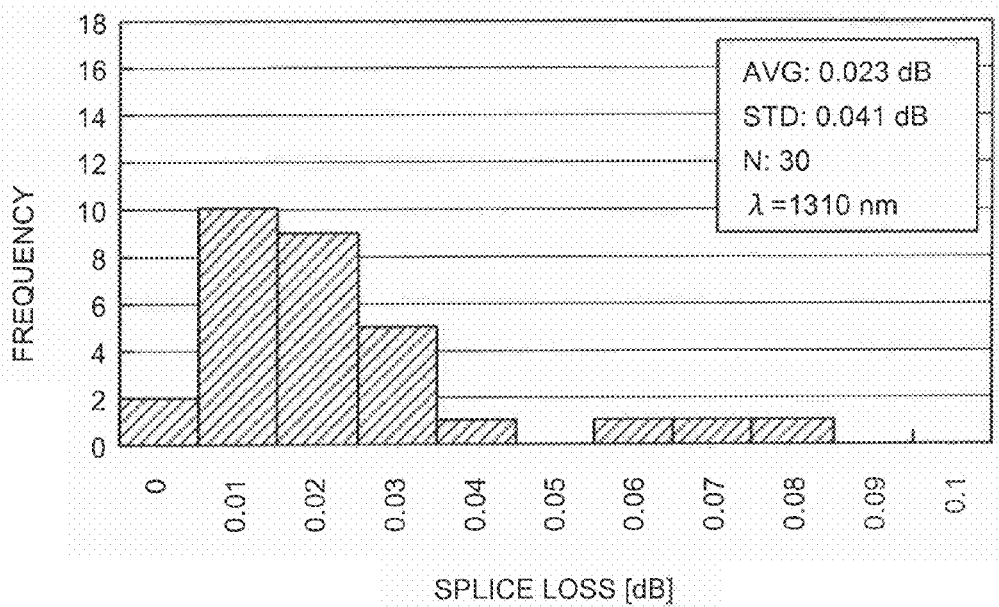
FIG. 6 is a graph showing a histogram of a splice loss when fusion splicing the optical fibers according to the comparison example 6 shown in FIG. 4.

FIG. 6 is a graph showing a histogram of the splice loss when fusion splicing the optical fibers according to the comparison example 6 shown in FIG. 4, where the number of samples N is 30. As shown in FIG. 6, in the case of the optical fiber according to the comparison example 6, the average value (AVG) of the splice loss is 0.023 dB, and the standard deviation (STD) is 0.041 dB.

Figure 7:
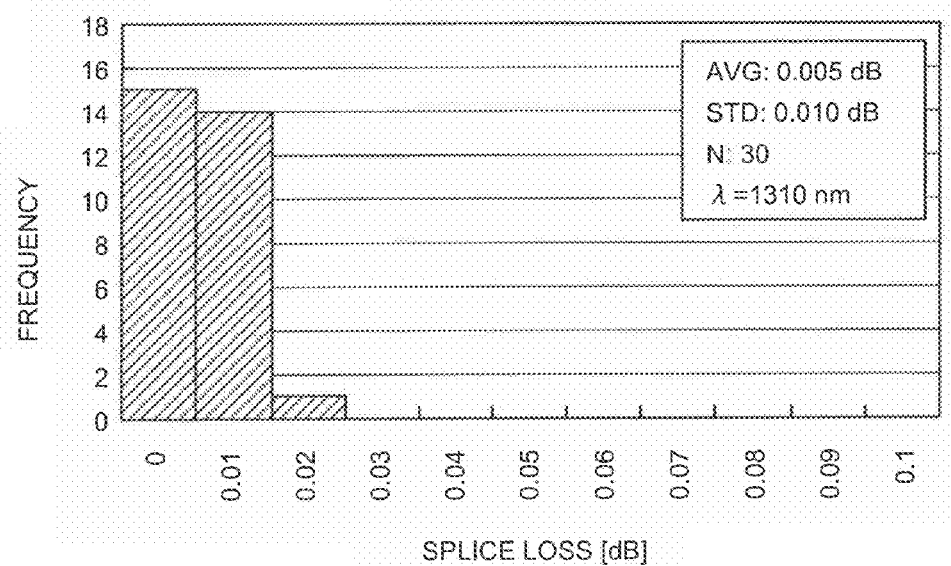
FIG. 7 is a graph showing a histogram of a splice loss when fusion splicing the optical fibers according to the embodiment example 5 shown in FIG. 4.

On the other hand, FIG. 7 is a graph showing a histogram of the splice loss when fusion splicing the optical fibers according to the embodiment example 5 shown in FIG. 4, where the number of samples N is 30. As shown in FIG. 7, in the case of the optical fiber according to the embodiment example 5, the average value (AVG) of the splice loss is 0.005 dB, and the standard deviation (STD) is 0.010 dB, which means that the splice loss is considerably low and its deviation is also small, compared with the case of the comparison example 6 that is an example of the standard SMF.

The specific reason why the optical fiber according to the embodiment example 5 has a low splice loss is considered that, because the MFD is larger than that of the standard SMF, even when there is an axis misalignment between two optical fiber to be connected, a fraction of the axis misalignment with respect to the magnitude of the MFD is small, and therefore, the influence of the axis misalignment on the splice loss is relatively small.

Although the splice losses shown in FIGS. 6 and 7 are measured at the wavelength of 1310 nanometers, the splice loss at the wavelength of 1550 nanometers is virtually the same because the splice loss is not much dependent on the wavelength.

As described above, the optical fibers according to the embodiment and the modification example have a low splice loss as well as a low transmission loss. Therefore, a span loss of an optical fiber cable using the optical fibers can be reduced by at least 1.5 dB, compared with the case of using the standard SMFs.

Figure 8:
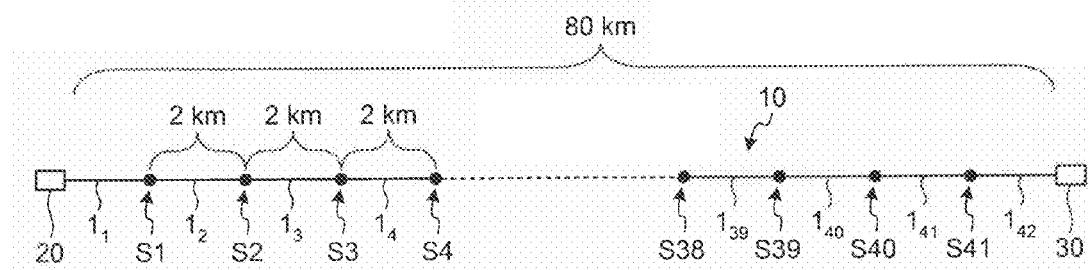
FIG. 8 is a schematic diagram for illustrating a case in which the optical fiber according to the embodiment is used.

FIG. 8 is a schematic diagram for illustrating a case in which the optical fiber according to the embodiment is used. As shown in FIG. 8, an optical fiber cable 10 is laid to connect an optical transmission device 20 and an optical transmission device 30 as a land transmission line. The optical fiber cable 10 has a structure in which optical fibers $1_1$ to $1_{42}$ according to the embodiment having the same configuration as that of the optical fiber 1 shown in FIG. 1 are fusion spliced at splice points S1 to S41. If an optical fiber cable laid in domestic Japan as the land transmission line is assumed, the span between the optical transmission devices 20 and 30 is 80 kilometers, the average length of the optical fibers $1_1$ to $1_{42}$ is 2 kilometers, and the splice points S1 to S41 are found at every 2 kilometers on average. Furthermore, although various optical communication devices including an optical amplifier and a connector and the like to connect the devices are connected to the optical fiber cable 10, these devices and connectors are not considered in the present discussion.

A span loss $A_{total}$ [dB] of the optical fiber cable 10 is expressed as the following Equation (4) considering only the transmission loss of the optical fibers $1_1$ to $1_{42}$ and the splice loss of the splice points S1 to S41.

$$A_{total} = \alpha L + \alpha_s x \quad (4)$$

where α is the transmission loss of the optical fibers $1_1$ to $1_{42}$ in dB/km, L is the length of the optical fiber cable 10 in kilometers, $\alpha_s$ is the splice loss of the splice points S1 to S41, and x is the number of the splice points S1 to S41.

If the value of 0.180 dB/km, which is the transmission loss of the embodiment example 5 shown in FIG. 4, is used as the transmission loss $\alpha$ of the optical fibers $1_1$ to $1_{42}$, and the value of 0.005 dB, which is the average value of the experiment shown in FIG. 7, is used as the splice loss $\alpha_s$ of the splice points S1 to S41, the span loss $A_{total}$ at the wavelength of 1550 nanometers is obtained as follows.

$$A_{total}=0.180\times80+0.005\times41=14.6 \text{ dB}$$

On the other hand, the span loss $A_{total}$ in the case of configuring an optical fiber cable using the standard SMF is as follows if the value of 0.190 dB/km, which is the transmission loss of the comparison example 6 shown in FIG. 4, is used as the transmission loss $\alpha$ of the standard SMF, and the value of 0.023 dB, which is the average value of the experiment shown in FIG. 6, is used as the splice loss $\alpha_s$ of the splice points S1 to S41.

$$A_{total}=0.190\times80+0.023\times41=16.1 \text{ dB}$$

This means that, in the case of using the optical fiber according to the embodiment example 5, the span loss of the optical fiber cable can be reduced by 1.5 dB compared with the case of using the standard SMF. In this manner, by reducing the span loss of the optical fiber cable, an output of a laser device or an optical amplifier, which is used as a light source for an optical signal, can be saved, and its electric power consumption can also be saved. At the same time, an occurrence of an unnecessary nonlinear optical phenomenon associated with the use of a high-power light can be suppressed.

According to one aspect of the present invention, it is possible to realize an optical fiber that realizes low transmission loss and low nonlinearity while maintaining equivalent characteristics to those of the standard SMF at low cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber made of silica-based glass, comprising:
    a center core region containing germanium having a first refractive index;
    an outer core layer containing fluorine having a second refractive index formed on an outer circumference of the center core region; and
    a cladding layer made of pure silica glass having a third refractive index formed on an outer circumference of the outer core layer, wherein
    the second refractive index is lower than the first refractive index,
    the third refractive index is higher than the second refractive index and lower than the first refractive index,
    a maximum relative refractive index difference $\Delta1$ of the center core region with respect to the cladding layer is 0.30% to 0.35%,
    a relative refractive index difference $\Delta2$ of the outer core layer with respect to the cladding layer is −0.10% to −0.04%,
    a ratio of the relative refractive index difference $\Delta1$ to the relative refractive index difference $\Delta2$ is 2.5:1 to 7.5:1,
    a diameter a of the center core region is 9.0 micrometers to 10.5 micrometers,
    a ratio a/b of the diameter a of the center core region to a diameter b of the outer core layer is 0.20 to 0.35, and
    optical characteristics of the optical fiber show that
        a cutoff wavelength is equal to or shorter than 1310 nanometers,
        a zero dispersion wavelength is 1285 nanometers to 1345 nanometers,
        a mode field diameter at a wavelength of 1550 nanometers is equal to or larger than 10.5 micrometers,
        a transmission loss at the wavelength of 1550 nanometers is equal to or lower than 0.185 dB/km, and
        a bending loss at the wavelength of 1550 nanometers is equal to or lower than 15 dB/m.

2. The optical fiber according to claim 1, wherein
the center core region has a refractive index profile with a dimpled portion,
a minimum relative refractive index difference $\Delta1'$ of the dimpled portion with respect to the cladding layer is 0.26% to 0.32%.

* * * * *